L. G. & A. C. HUMBERT.
VEHICLE WHEEL AND TIRE.
APPLICATION FILED SEPT. 8, 1914.
1,179,433.
Patented Apr. 18, 1916.
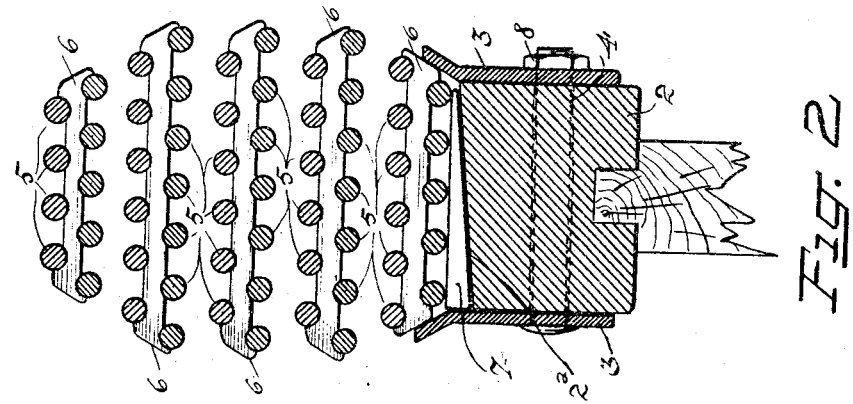
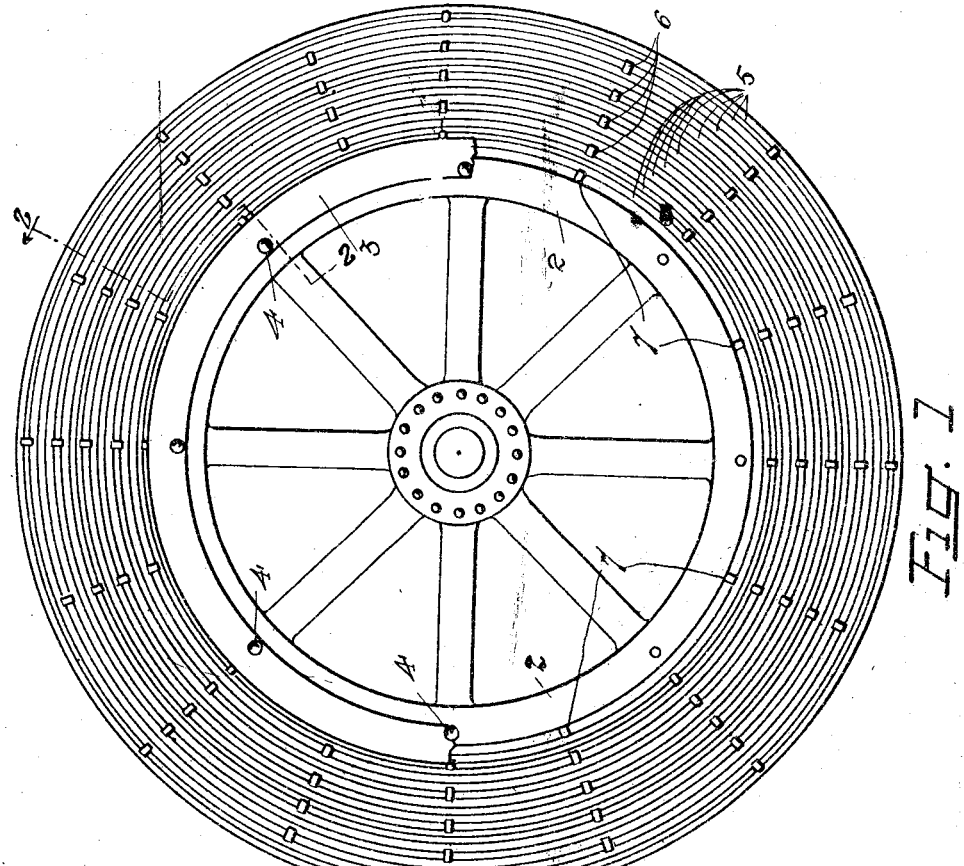
Witnesses:
Leon G. Humbert
Adrien C. Humbert Inventors
By
Attorneys

UNITED STATES PATENT OFFICE.

LEON G. HUMBERT AND ADRIEN C. HUMBERT, OF EDMONTON, CANADA.

VEHICLE WHEEL AND TIRE.

1,179,433.  Specification of Letters Patent.  Patented Apr. 18, 1916.

Application filed September 8, 1914. Serial No. 860,532.

*To all whom it may concern:*

Be it known that we, LEON G. HUMBERT and ADRIEN C. HUMBERT, both citizens of the French Republic, residing at 9937 One Hundred and Tenth street, Edmonton, Province of Alberta, Canada, have invented certain new and useful Improvements in Vehicle Wheels and Tires; and we do hereby declare that the following is a full, clear, and exact description of the invention, such as will enable others skilled in the art to which it appertains to make and use the same.

The invention to be hereinafter described relates to vehicle wheels and tires.

In order to more clearly disclose the construction, operation, and use of the invention, reference should be had to the accompanying drawings forming part of the present application.

Throughout the several figures of the drawings like reference characters designate the same parts.

In the drawings: Figure 1 is a detail side view of the wheel; and Fig. 2 is a section on line 2—2 of Fig. 1 looking in the direction of the arrows.

The main objects of the invention are, to provide a light, strong, and durable wheel, having an all metal tire of sufficient resiliency to replace the pneumatic tire now in use.

Referring to the drawings in detail, 1 indicates a wheel of standard construction having a moderately thick rim 2 which has its outer face beveled to one side, as at 2ª Fig. 2. Retaining flanges 3 are secured on each side of rim 2, in the usual manner, by means of bolts 4 passed through the rim and secured by the usual nuts.

The tire is composed of a series of concentric sets of heavy steel wires 5. The sets of wires are spaced apart by suitable spacing blocks 6 recessed in their upper and under faces to fit the contour of the upper portion of the wires. These blocks are radially disposed about the tire, in rows, those of one row alternating in position with those of the next preceding row. As will be noted from Fig. 2, the first or inner set of wires contains but five wires, the next six, the next seven, the next six, the next seven, the next six, the next seven, the next six, the next five, and the outer row four. The wires of each set are spaced apart a distance a little greater than the thickness of the wires, and the sets are arranged in staggered order, so that the wires of one set fall directly below the spaces between the wires of the next set. By this arrangement, the wires of one set, when deformed, can expand between those of the next set, thus permitting a maximum of play and eliminating possible interference. This arrangement gives the tire the recognized standard shape and a maximum of resiliency. The ends of the spacing blocks are shaped to conform with the general outline of the tire, to obtain maximum efficiency.

In assembling, the sets of wires are placed about the rim 2 of the wheel in loose position. When the tire has been loosely assembled a number of wedges 7 having their upper faces plane and their under faces beveled oppositely to the bevel of rim 2 are placed radially about the rim, beneath the inner set of wires, in alternating relation to the spacing blocks of the innermost series. The flange 3, on that side of rim 2 from which the wedges 7 project, is now placed in position and drawn tight against the side of the rim, by means of the nuts 8 threaded on to bolts 4. This forces wedges 7 in flush with the side of the rim, and the wedges force the wires of each set outwardly, so as to be firmly seated in, and held by, the spacing blocks 6, which thus serve also to secure the sets of wires against possible creeping or movement around the wheel. This gives a very strong and light tire of great resiliency which can be quickly and easily mounted or demounted, as desired.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described our invention, what we claim as new and desire to secure by Letters Patent is:

1. In a device of the character described; a wheel having a rim beveled on its outer face, toward one side; retaining flanges mounted on said rim; securing means therefor; concentric sets of wires arranged about said wheel in such a manner that the wires of one set fall directly below the spaces between the wires of the next set, blocks mounted therebetween and adapted to space the wires of each set and to space the sets, and to form means for securing said sets of wires against gripping; and wedges having plane outer faces and inner faces beveled oppositely to the bevel of the said rim, said wedges being disposed radially about the said rim beneath the innermost set of wires and placed in alternate relation to the spacing blocks of the innermost series.

2. In a device of the character described; a wheel having a rim beveled on its outer face toward one side; retaining flanges mounted on said rim; securing means therefor; concentric sets of wires mounted about the said wheel, the wires of each set being spaced apart a distance slightly greater than the thickness of each of the said wires, and the said sets being so arranged that the wires of one set fall below the spaces between the wires of the next set; blocks mounted in staggered order between said sets of wires and recessed to receive the wires of each set; and wedges having plane upper faces and under faces beveled oppositely to the bevel of the said rim disposed circumferentially about said rim beneath the innermost set of wires, the said wedges being placed in alternating relation to the spacing blocks of the innermost series.

In witness whereof we have hereunto set our hands in the presence of two witnesses.

LEON G. HUMBERT.
ADRIEN C. HUMBERT.

Witnesses:
CARO E. RATCHFORD,
C. W. SIEVEWRIGHT.